(12) United States Patent
El Kadiri

(10) Patent No.: US 7,782,714 B2
(45) Date of Patent: Aug. 24, 2010

(54) TIME PIECE FORMING A NAVIGATION AID FOR PILOTS AND SEAMEN

(75) Inventor: Hakim El Kadiri, Saint-Blaise (CH)

(73) Assignee: Hamilton International Ltd., Bienne (CH)

( * ) Notice: Subject to any disclaimer, the term of this patent is extended or adjusted under 35 U.S.C. 154(b) by 442 days.

(21) Appl. No.: 11/721,134

(22) PCT Filed: Nov. 8, 2005

(86) PCT No.: PCT/EP2005/011941

§ 371 (c)(1), (2), (4) Date: Jun. 7, 2007

(87) PCT Pub. No.: WO2006/061072

PCT Pub. Date: Jun. 15, 2006

(65) Prior Publication Data

US 2009/0231961 A1    Sep. 17, 2009

(30) Foreign Application Priority Data

Dec. 7, 2004   (EP)   ................................. 04028918

(51) Int. Cl.
G04B 47/00  (2006.01)
(52) U.S. Cl. ................... 368/14; 368/10; 235/78 N
(58) Field of Classification Search ................... 368/10, 368/14; 235/78 N, 61 NV
See application file for complete search history.

(56) References Cited

U.S. PATENT DOCUMENTS

| 3,127,102 | A | * | 3/1964 | Fallis | ........................ 235/61 B |
|---|---|---|---|---|---|
| 3,203,391 | A | * | 8/1965 | Corwin | ........................ 116/308 |
| 3,241,308 | A | * | 3/1966 | Forney | ........................ 368/14 |
| 3,835,299 | A | * | 9/1974 | Turney | ................... 235/61 NV |
| 3,971,915 | A | * | 7/1976 | Fletcher et al. | ......... 235/61 NV |
| 4,359,629 | A | * | 11/1982 | Shephard | ................... 235/78 N |
| 4,479,724 | A | * | 10/1984 | Matsumoto et al. | .......... 368/291 |
| 5,883,861 | A | * | 3/1999 | Moser et al. | .................... 368/10 |
| 5,982,710 | A | * | 11/1999 | Rawat et al. | ................... 368/21 |

FOREIGN PATENT DOCUMENTS

| CH | 192393 | 12/1937 |
|---|---|---|
| FR | 2 652 156 | 3/1991 |
| GB | 555 155 | 8/1943 |
| JP | 2-236488 | 9/1990 |

OTHER PUBLICATIONS

International Search Report issued in corresponding application No. PCT/EP2005/011941, completed Feb. 6, 2006 and mailed Feb. 13, 2006.

* cited by examiner

*Primary Examiner*—Vit W Miska
*Assistant Examiner*—Sean Kayes
(74) *Attorney, Agent, or Firm*—Griffin & Szipl, P.C.

(57) ABSTRACT

Timepiece, particularly of the wristwatch (1) type, forming a navigational aid for aviators or navigators, including at least a bezel (46) and a ring (38) that are concentric, at least one of which rotates, the bezel (46) bearing first indications (48) corresponding to the speed of an aircraft, or respectively a boat, and the ring (38) bearing indications (50) relating to the heading correction to be applied in the event of a crosswind, a nomogram (58) for the heading correction calculation being added to the back of the watch (1) or to a separate card.

13 Claims, 7 Drawing Sheets

TIME PIECE FORMING A NAVIGATION AID FOR PILOTS AND SEAMEN

This is a National Phase Application in the United States of International Patent Application No. PCT/EP2005/011941 filed Nov. 8, 2005, which claims priority on European Patent Application No. 04028918.3, filed Dec. 7, 2004. The entire disclosures of the above patent applications are hereby incorporated by reference.

FIELD OF THE INVENTION

The present invention concerns a timepiece such as a wristwatch forming a navigational aid for aviators and sailors. More specifically, the present invention concerns a timepiece of this type that enables a pilot or sailor to calculate the heading correction to be made to his path in order to take account of a crosswind.

BACKGROUND OF THE INVENTION

Let us suppose that an aircraft pilot wishes to go by air from a first point to a second point and that a crosswind is blowing on the route that the pilot will have to take to connect these two points. The pilot will have to apply a correction to the path of his aircraft in order to take account of the crosswind; otherwise he will drift off his route and will be unable to reach his destination point.

In order to calculate this path correction, the pilot currently has available a nomogram or abacus type navigation instrument well known in the aeronautics field. This navigational aid takes the form of an assembly of three concentric superposed discs able to be rotated in relation to each other and to which data is added relating to the speed of the aircraft, the true magnetic heading, the crosswind value and the angular correction to be made to the aircraft's path. On the upper disc which is transparent, a nomogram used for effecting a part of the path correction calculation is provided.

The aircraft pilot, like the navigator, thus has an instrument that allows him, via a certain number of readings of numbered indications and calculations, to determine the heading correction to apply in order to take account of a crosswind. It is clear, of course, that the pilot or sailor must have this instrument permanently to hand. However, this instrument can easily be lost among the numerous charts, official documents and other items that the pilot or sailor has to carry with him. Moreover, this navigational instrument is conventional made of cardboard. It can thus become dirty and worn.

It is an object of the present invention to overcome the aforementioned drawbacks in addition to others by providing a timepiece associated with a nomogram type navigation instrument as described above.

SUMMARY OF THE INVENTION

The present invention therefore concerns a timepiece, particularly a wristwatch, forming a navigational aid for aviators or navigators, characterized in that it comprises at least a bezel and a ring that are concentric, at least one of which rotates, the bezel bearing first indications corresponding to the speed of an aircraft, or respectively a boat, and the ring bearing indications relating to the heading correction to be applied in the event of a crosswind, a heading correction calculation nomogram being added to the back of the watch or on a separate card.

Owing to these features, the present invention provides a timepiece associated with a nomogram type navigational instrument for aviators and navigators. Since the latter permanently wear a watch on their wrist, they immediately have available an instrument allowing them to calculate the correction to be made to their path to take account of any crosswind. The risk of losing this instrument among other documents is thus avoided. Likewise, the invention provides a navigational aid that is not liable to become dirty or to deteriorate.

According to a complementary feature of the invention, the timepiece includes a second rotating ring on which the results of the calculation of the heading correction to be applied are added.

The user thus has an aide-memoir that reminds him of the calculations he has made and which enables him to avoid repeating these calculations which are relatively long and complex.

BRIEF DESCRIPTION OF THE DRAWINGS

Other features and advantages of the present invention will appear more clearly from the following detailed description of an embodiment of the timepiece according to the invention, this example being given purely by way of non-limiting illustration in conjunction with the annexed drawing, in which.

DETAILED DESCRIPTION OF THE ILLUSTRATIVE EMBODIMENTS

The present invention will be described with reference to a wristwatch to be used in the aeronautics industry. It goes without saying that the present invention applies in a similar manner to the maritime world, the only difference lying in the order of magnitude of the speeds involved, the speed of a ship being evidently much lower than that of an aircraft.

Figure 1A:
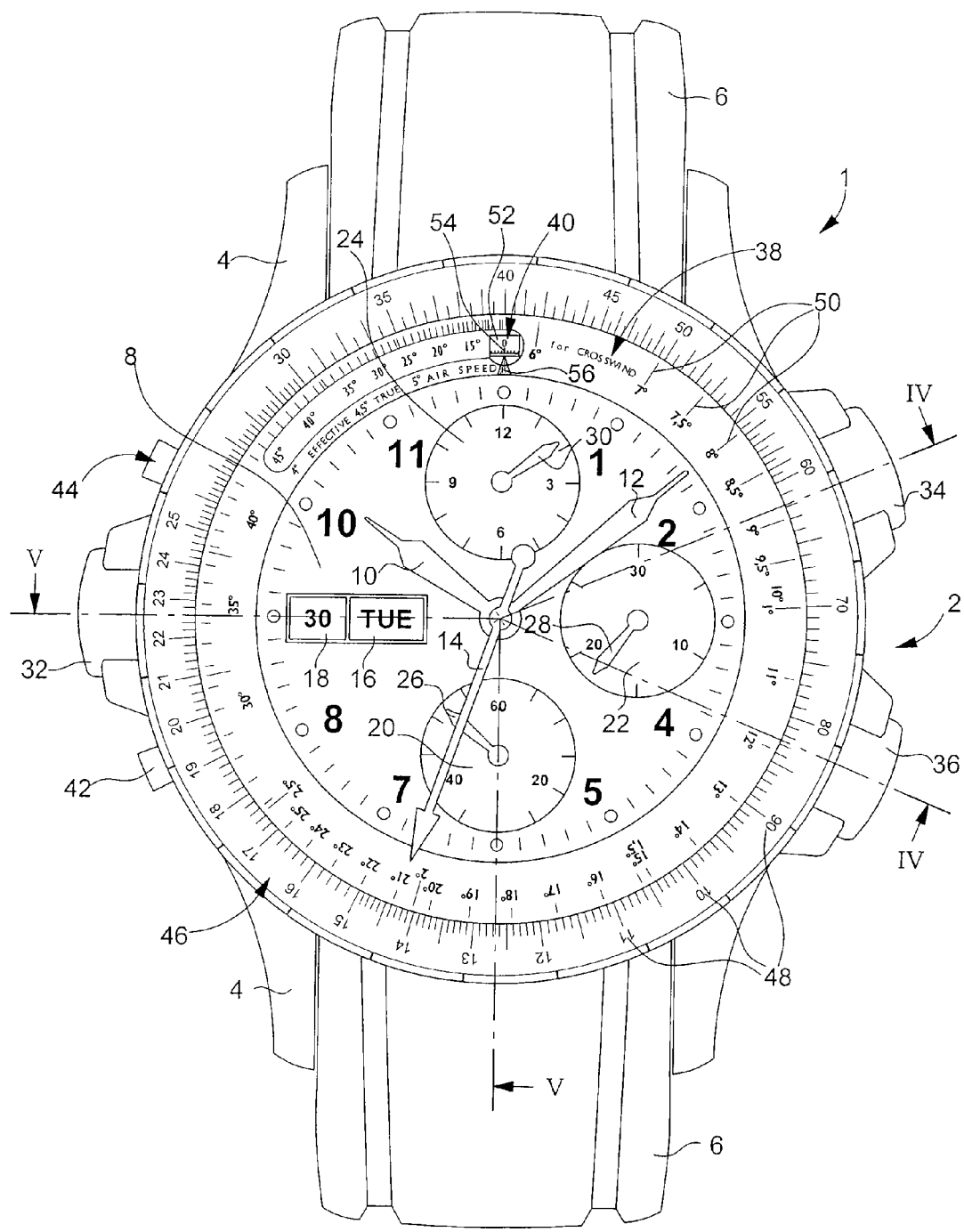
FIGS. 1A to 1C are top views of a wristwatch according to the present invention at different stages of the path correction calculations.

The timepiece shown in conjunction with FIG. 1A is of the wristwatch type. It will be understood that the invention is not limited to this type of wristwatch and that it can apply to any other type of timepiece such as a pocket watch. Designated as a whole by the general reference number 1, the wristwatch includes a middle part 2 extended at midday and six o'clock by two pairs of horns 4 for securing the strands 6 of a wristband or bracelet.

Wristwatch 1 also includes a dial 8, above which an hour hand 10, a minute hand 12 and second hand 14 move. Two apertures 16 and 18 are made in dial 8, for respectively displaying the day of the week and the date.

Three other small dials 20, 22 and 24 are arranged on the dial 8 of largest dimensions. These dials 20, 22 and 24 are used for counting the seconds, minutes and hours when a timing function is activated and each comprise for this purpose a hand, respectively 26, 28 and 30.

Wristwatch 1 also includes a crown 32 arranged at 9 o'clock for adjusting the time functions. Wristwatch 1 further includes two crowns 34 and 36 arranged respectively at 2 o'clock and at 4 o'clock for controlling the rotation of two rotating rings 38 and 40 as described in detail below, as well as two push-buttons 42 and 44 arranged at 8 o'clock and 10 o'clock for starting, stopping and resetting the chronograph function.

As can be seen upon examining FIG. 1, wristwatch 1 according to the invention is provided with two rotating rings 38, 40 and a rotating bezel 46 to which information relating to the speed of the aircraft and the heading correction to be made has been added. Two rotating rings 38, 40 and rotating bezel 46 are concentric.

More specifically, rotating bezel 46 is an outer bezel capable of being rotated by hand. Indications 48 relating to the speed of the aircraft are added to this bezel 46. The speeds added to bezel 46 correspond to a tenth of the real speed of the aircraft and are expressed in nautical miles per hour. Thus, the number "18" marked on bezel 46 corresponds to an aircraft speed of 180 Kts.

Two rotating rings 38 and 40 are inner rings, which are controlled in rotation by crowns 34 and 36 respectively. Ring 38 bears graduations 50 expressed in degrees which correspond to the heading correction to be applied to the path of an aircraft as a function of a given crosswind. Ring 38 also has an aperture 52 through which can be seen the graduations 54 on ring 40, which is arranged underneath ring 38. Graduations 54 on ring 40 correspond to the results of the calculations carried out by the aviator to determine the heading correction to be made to the path of his aircraft taking account of the direction of the crosswind. Once these calculations are finished, the aviator can make the result obtained appear in aperture 52 by rotating ring 40 by means of crown 36. The aviator thus has a storage function for the results of his calculations to which he can refer at any time. Graduations 54 on ring 40 correspond to directions expressed in degrees as will now be described in detail.

The user must first of all determine by means of a geographical chart the magnetic declination called "VAR" at the place where he is located. The magnetic declination (VAR) is the difference between geographical north corresponding to the meridians orientation traced on the map and magnetic north indicated by the compass. By way of example, the magnetic declination is 4° west in the west of France and 1° west in Geneva (Switzerland). If the course to be followed is for example 140° and the magnetic declination is 10° west, the magnetic declination must be subtracted from the course, i.e. course 140°−10°=130°. Next, the force and direction of the wind on the path must be known. This information is given by the control tower for the take-off and landing phases, and by air charts for winds at altitude. Let us assume then that the wind is blowing at 40 Kts and its direction is 100°. The difference between the course to be followed (130°) and the wind direction (100°) is calculated and the result obtained is 130°−100°=30°. As the zero of graduation 54 on ring 40 is placed at 12 o'clock, ring 38 is then rotated by means of crown 34 so as to make the number "30", corresponding to the result of the calculated carried out as described above (see FIG. 1B), appear in aperture 52. The aviator can thus temporarily store this intermediate result. Moreover, the aviator has a marking 56, for example in the form of an arrow, made on ring 38 at aperture 52. This marking gives the aviator an indication as to the wind direction. Indeed, the default assumption is that the course to be followed is at 12 o'clock. Thus, it is very useful to always have in flight an indication of the wind direction relative to the course to be followed and thus to be able to determine, at a glance, whether the wind is favourable or not. This is particularly important for calculating the flight time or petrol consumption.

Let us now assume that the real speed of the aircraft is 180 Kts. The user will rotate the outer rotating bezel 46 by hand to bring the number "18" to face marking 56. He must then refer to nomogram 58 (see FIG. 2), which may be provided on the back of the watch or on a separate card. The crosswind components are on the outermost arc of a circle. The previously calculated value of 30° is subtracted from the value of 90° to obtain 60°. This point is broken down into an orthonormed speed marking. Projecting this point onto the abscissa axis gives a value of 25 Kts and projecting the same point onto the ordinate axis gives a value of 44 Kts. The aircraft speed is added to the preceding figure, i.e. 180+25=205 Kts. On bezel 46, the value 205 Kts can be read, which corresponds almost exactly to the figure "20" when this value is divided by ten, and the corresponding figure can be read opposite on ring 38, i.e. approximately 6.5°. This crosswind component of 6.5° is added to the value of the true magnetic course equal to 130° and a real course of 136.5° is thus obtained, which corresponds to the course to be followed by the pilot taking account of the crosswind. For the memory, the result of this calculation (136.5°) can be made to appear in the aperture 52 by rotating ring 40 by means of crown 36. The user thus has an aide-memoir reminding him of the final result of the calculations that he has carried out (see FIG. 1C).

In the foregoing description, ring 38 is rotating, in order to allow the user to temporarily store the difference between the true magnetic course and the crosswind direction. However, according to a simplified variant of the invention, ring 38 could be fixed, and thus allow only the final result of the calculations made by the aviator to be stored, namely the course to be followed by the pilot to take account of the crosswind.

Figure 1B:
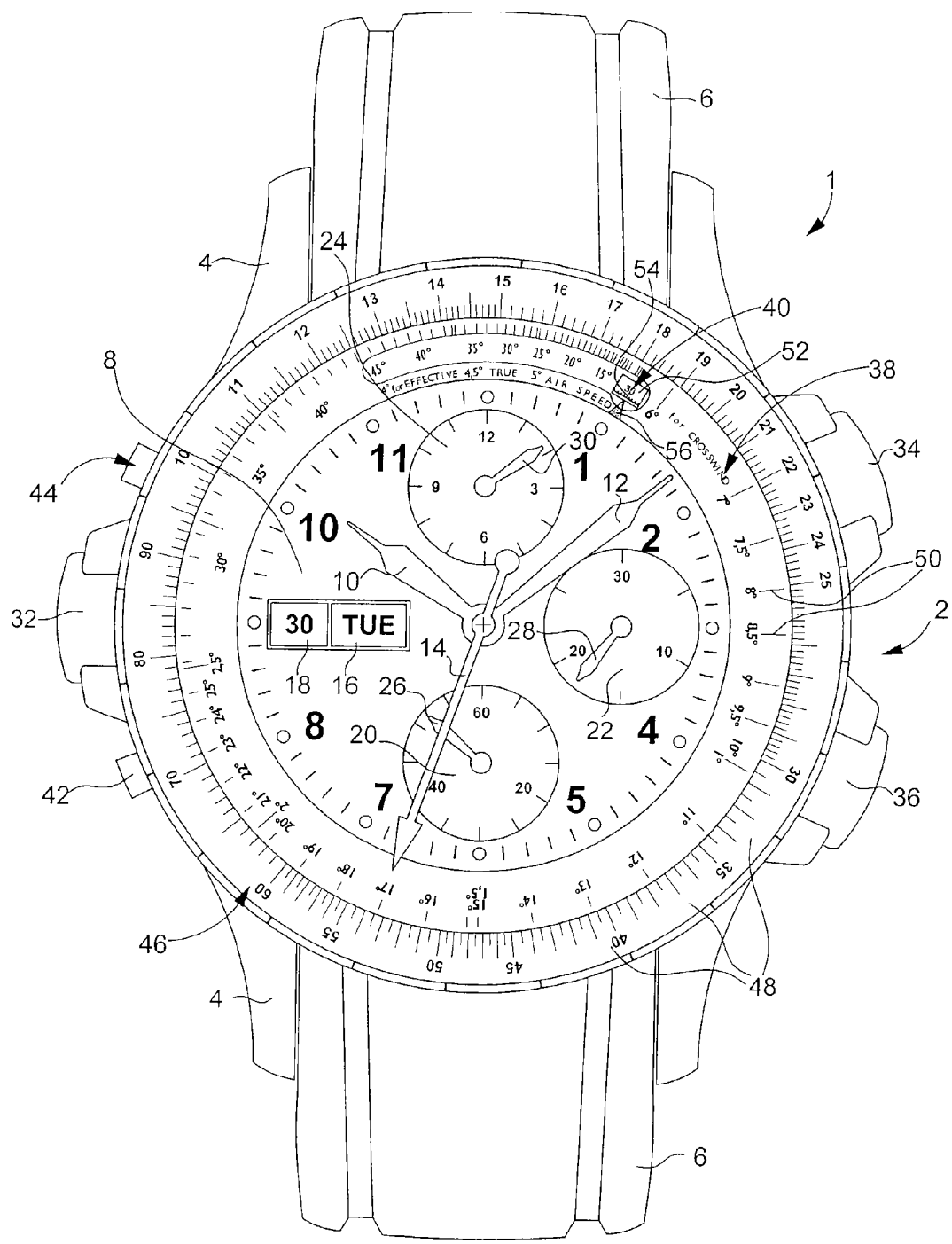
Figure 1C:
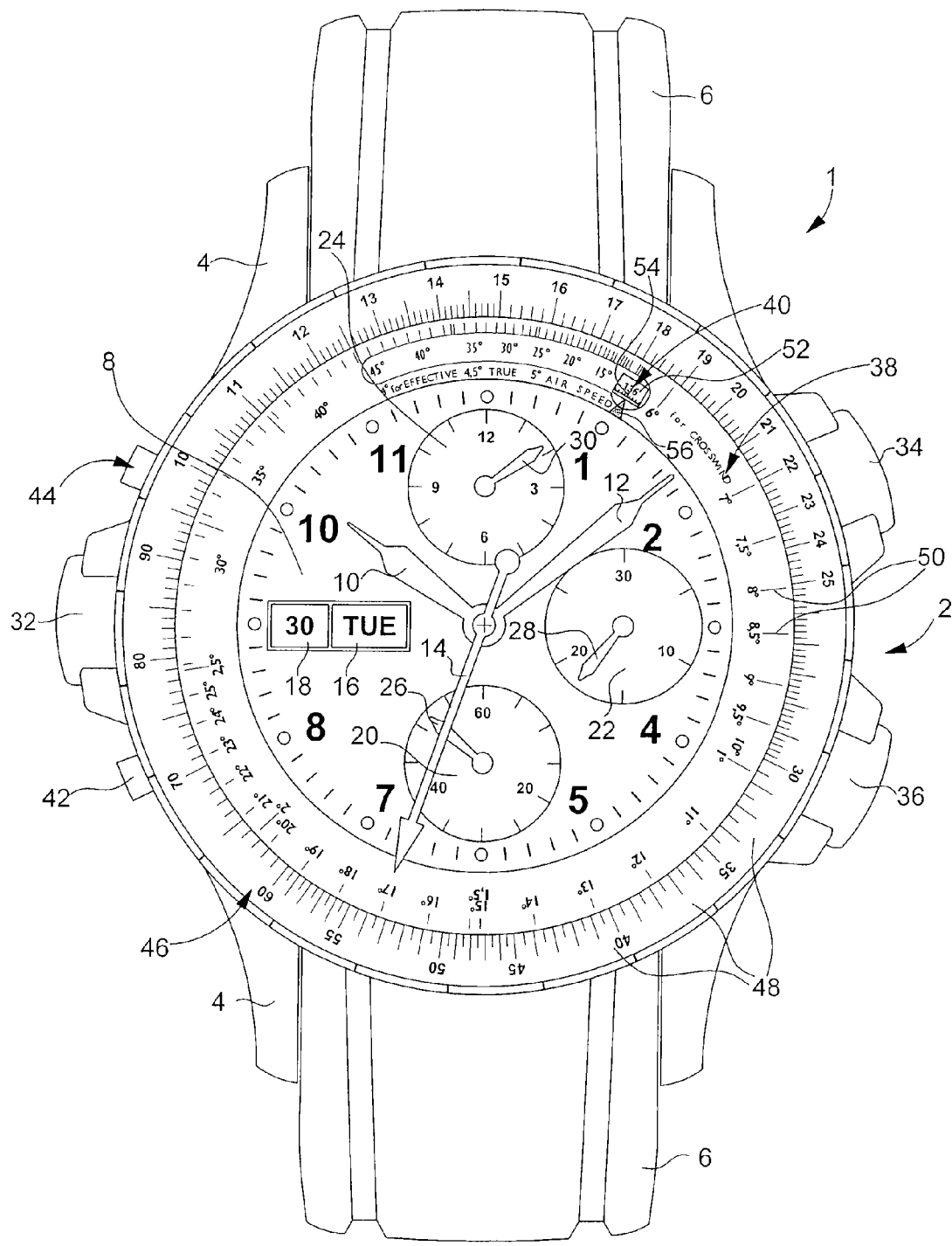
Figure 2:
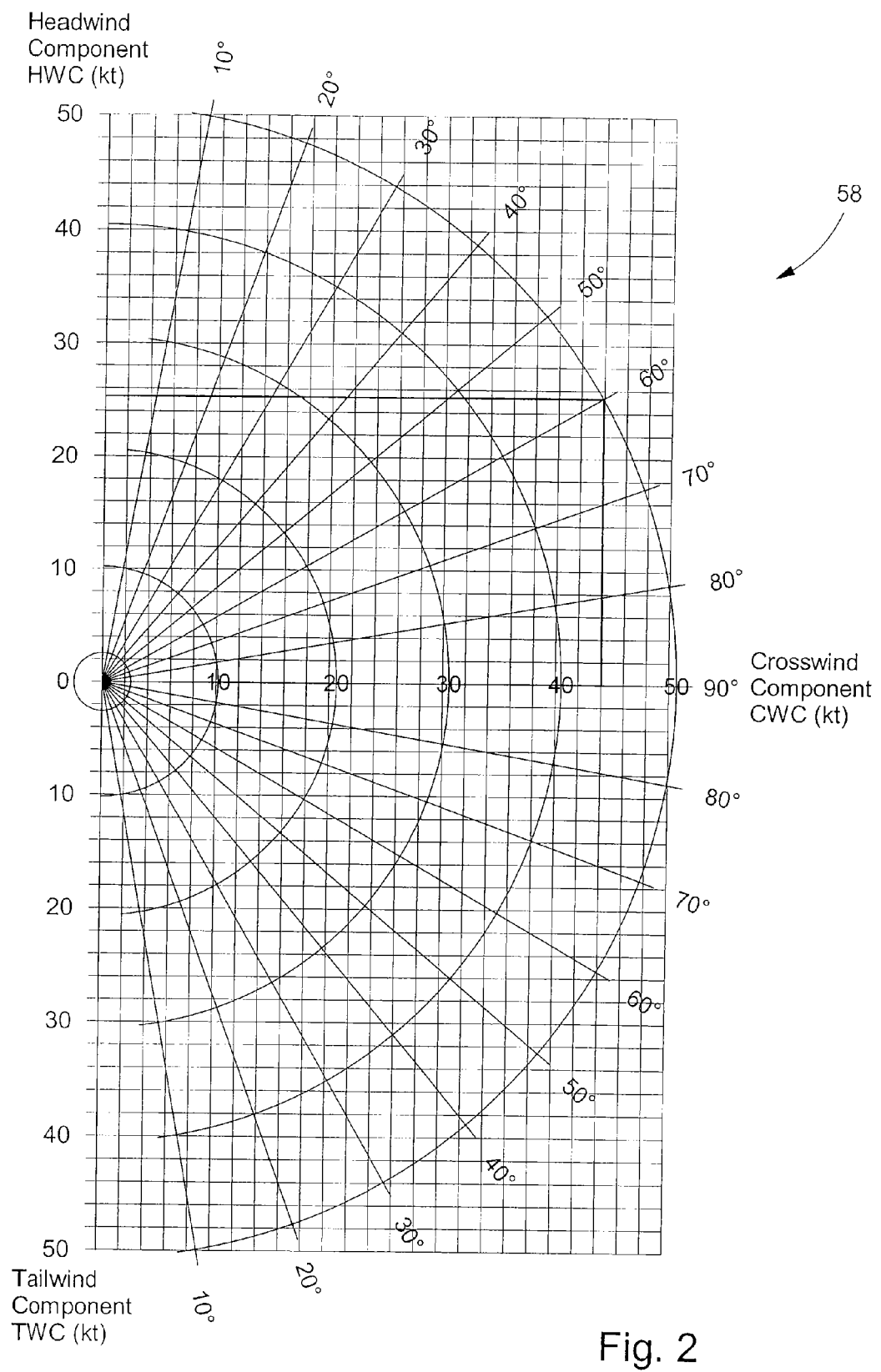
FIG. 2 is a diagram of a nomogram used for determining the heading correction to be applied to the path of an aircraft or boat and which can be added to the back of the watch or to a separate card.
Figure 3:
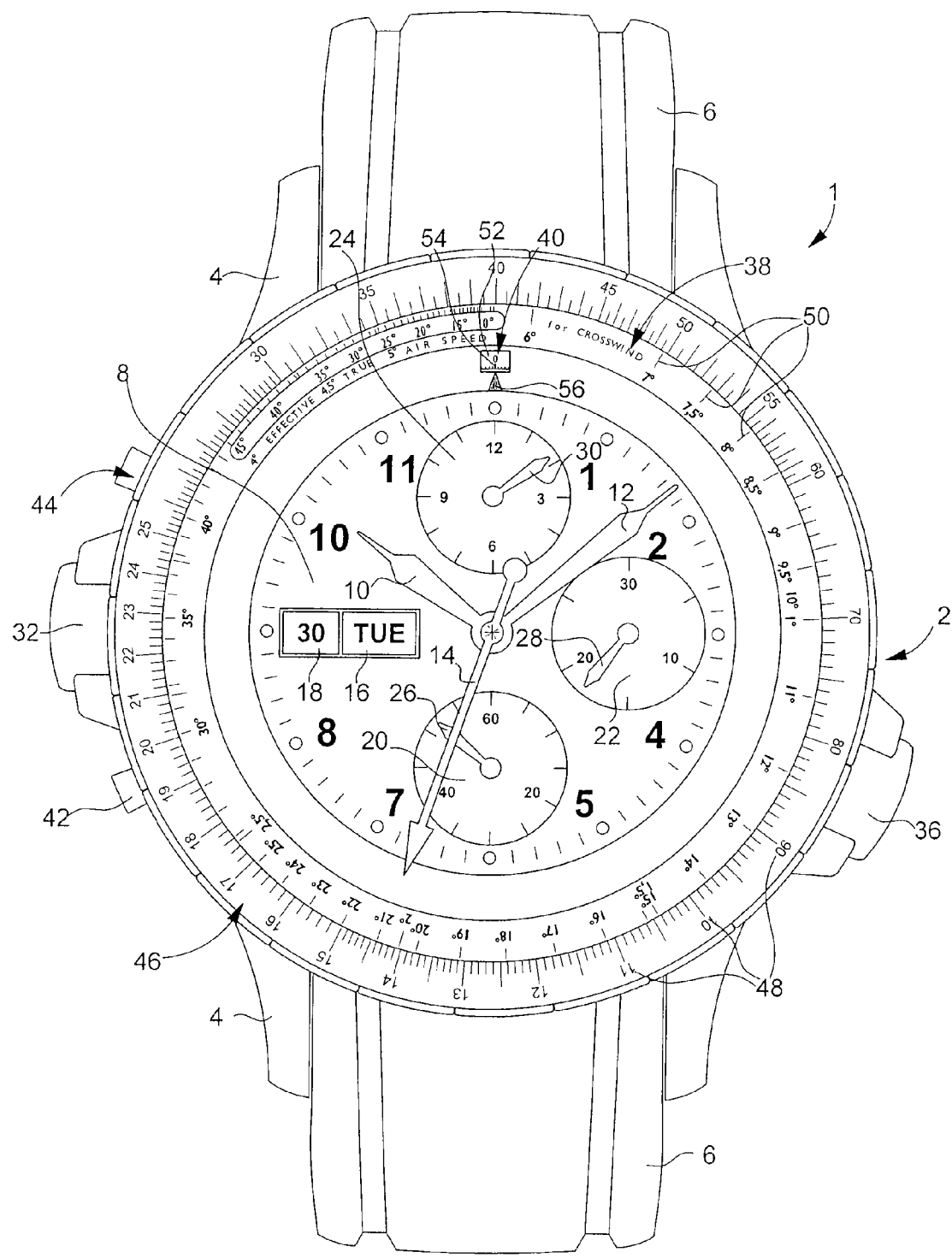
FIG. 3 is a schematic diagram of a variant of the watch shown in FIG. 1.

In the example illustrated in FIGS. 1A to 1C, watch 1 according to the invention includes an outer bezel 46 and two inner respectively top 38 and bottom 40 rings. Of course, this example is given purely by way of illustration and one could also provide two rotating outer bezels 46a, 38a and a single rotating inner ring 40a as shown schematically in FIG. 3.

It will be understood that "inner ring" means a ring arranged underneath crystal 60 of watch 1, whereas "outer bezel" means a bezel arranged around crystal 60.

Figure 4:
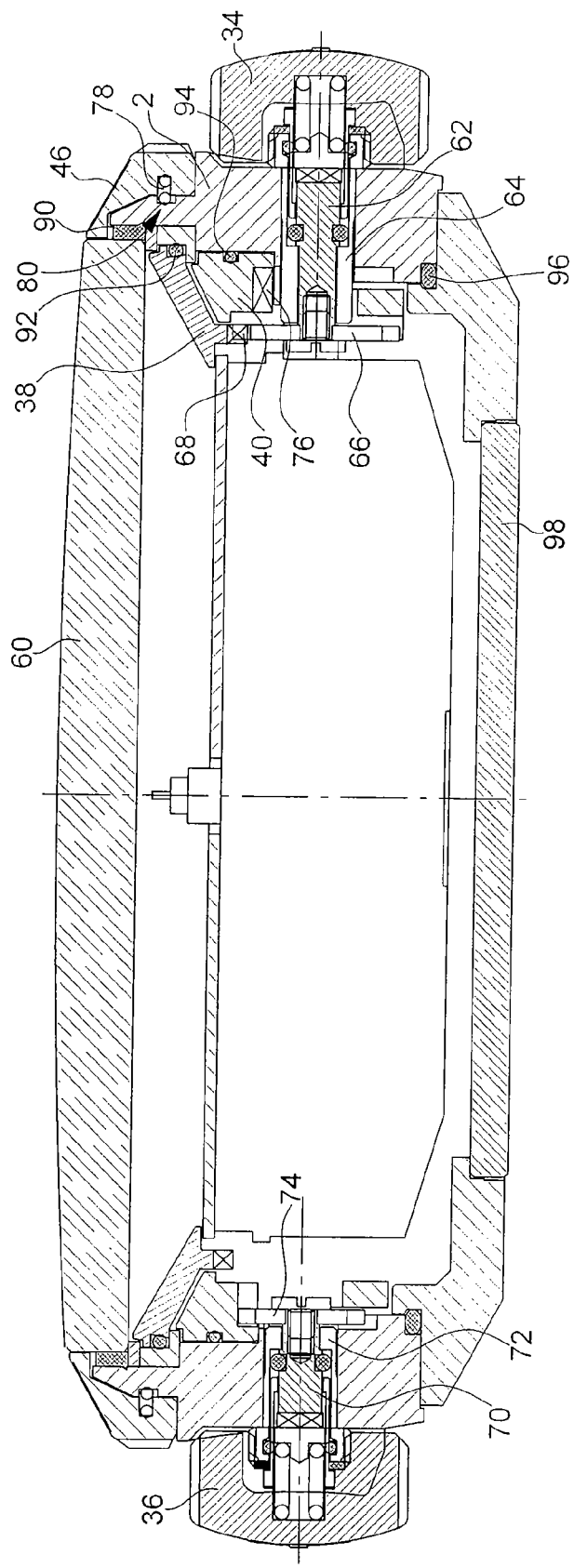
FIG. 4 is a cross-section along the line IV-IV of FIG. 1.
Figure 5:
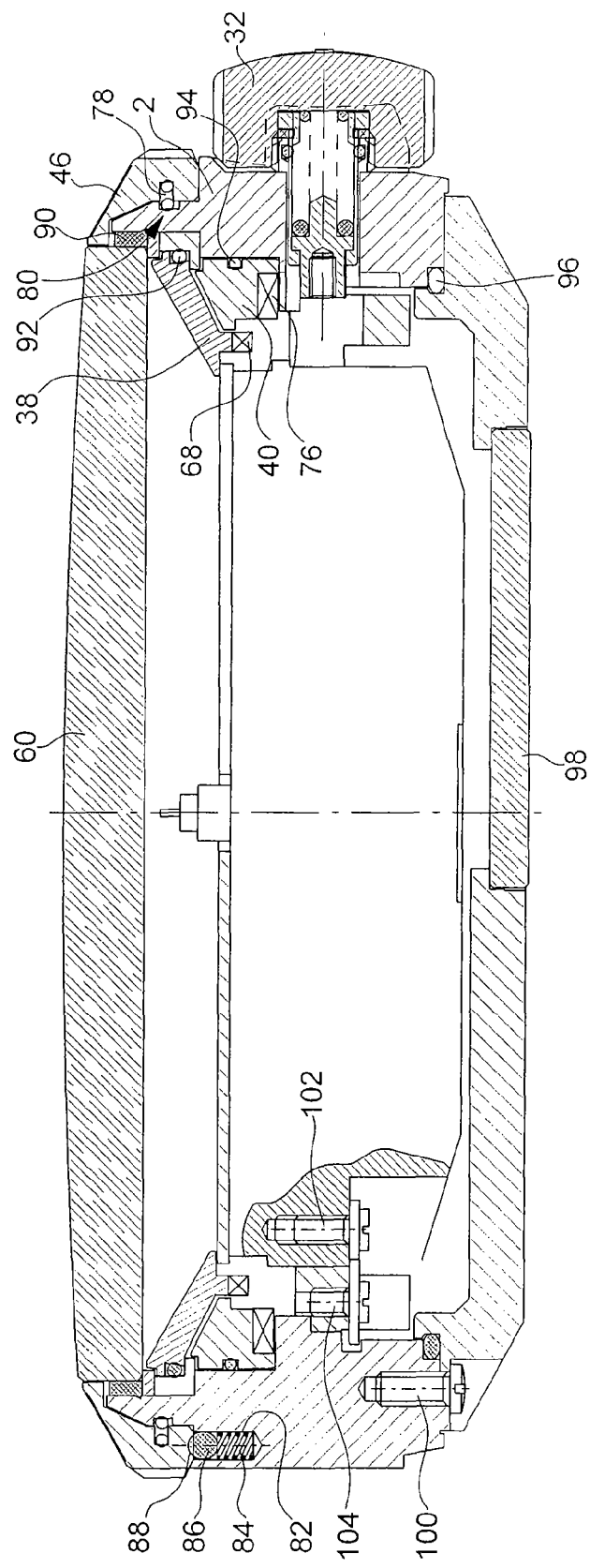
FIG. 5 is a cross-section along the line V-V of FIG. 1.

FIGS. 4 and 5 are cross-sections of wristwatch 1 respectively along line IV-IV and line V-V of FIG. 1.

Crown 34 is mounted at the end of a pin 62 which is engaged in a through hole 64 arranged at 2 o'clock in the middle part 2 of watch 1. This pin 62 carries at the free end thereof a toothed pinion 66 for meshing with the teeth 68 provided at the base of ring 38. Likewise, crown 36 is mounted at the free end of a pin 70, which is engaged in a through hole 72 arranged at 4 o'clock in the middle part 2 of watch 1 and which carries at the free end thereof a toothed pinion 74 for meshing with the teeth 76 provided at the base of ring 40.

An elastic ring 78, arranged in a circular groove 80 made partly in middle part 2 and partly in outer bezel 46, allows said bezel 46 to rotate relative to said middle part 2 without damaging the latter. At least one and preferably two diametrically opposite blind holes 82 are made in middle part 2. In each of these blind holes 82 there is a slightly compressed spring 84 on which a ball 86 is mounted, said ball being housed in a corresponding cavity 88 provided at the base of outer bezel 46. This device forms a limit to the rotation of bezel 46 for preventing the latter from rotating too easily. A sealing gasket 90 is arranged between crystal 60 and middle part 2 and sealing joints 92 and 94 are arranged between each of rotating rings 38 and 40 and said middle part 2. A sealing gasket 96 is also provided between the back cover 98 of watch 1 and middle part 2. Back cover 98 may be for example screwed onto middle part 2 by means of screws 100. Finally, screws 102 and 104 are provided for mounting the movement and its casing ring.

It goes without saying that the present invention is not limited to the embodiment that has just been described and that various simple alterations and variants can be envisaged by those skilled in the art without departing from the scope of the present invention as defined by the claims annexed to this Patent Application.

The invention claimed is:

1. Timepiece forming a navigational aid for aviators or navigators, the timepiece comprising at least a bezel and a first ring that are concentric, at least one of the bezel and the first ring rotates, wherein the bezel bears first indications corresponding to a speed of an aircraft or a boat, wherein the first ring bears indications relating to a course correction to be applied to a path of the aircraft or the boat in the event of a crosswind, wherein the course correction is obtained from the direction of the crosswind associated with the speed of the aircraft or the boat, and wherein a nomogram for calculating the course correction is added to the back of the timepiece.

2. Timepiece according to claim 1, wherein the first ring also rotates.

3. Timepiece according to claim 2, wherein the bezel is an outer bezel arranged around a crystal of the timepiece, and wherein the first ring is an inner ring arranged underneath the crystal.

4. Timepiece according to claim 2, wherein the bezel is an outer bezel and the first ring is an inner ring, and wherein the bezel and the first ring are arranged around a crystal of the timepiece.

5. Timepiece according to claim 1, wherein the bezel is an outer bezel arranged around a crystal of the timepiece, and wherein the first ring is an inner ring arranged underneath the crystal.

6. Timepiece according to claim 1, wherein the bezel is an outer bezel and the first ring is an inner ring, and wherein the bezel and the first ring are arranged around a crystal of the timepiece.

7. Timepiece according to claim 1, wherein the timepiece includes a second rotating ring to which are added indications corresponding to results of calculations carried out to determine the course correction to be applied to the path of the aircraft or the boat in the event of the crosswind.

8. Timepiece according to claim 7, wherein the second ring is arranged underneath the first ring that includes an aperture through which the indications added to the second ring are visible.

9. Timepiece according to claim 1, wherein an elastic ring is arranged in a circular groove made partly in a middle part of the timepiece and partly in the outer bezel.

10. Timepiece according to claim 1, wherein, in at least one blind hole made in the middle part, there is arranged a spring on which a ball is mounted, the ball being housed in a corresponding cavity provided at the base of the outer bezel.

11. Timepiece according to claim 1, wherein the first ring bears a marking which gives an indication to the direction of the crosswind relative to a course to be followed.

12. Timepiece according to claim 1, wherein the course correction to be applied to the path of the aircraft or the boat in the event of the crosswind is calculated using information given by a control tower for take-off and landing phases of the aircraft or the boat, and by air charts for the crosswind at an altitude.

13. Timepiece according to claim 1, wherein the timepiece is formed of a wristwatch or a pocket watch.

\* \* \* \* \*